(12) United States Patent
Betzler et al.

(10) Patent No.: US 8,978,350 B2
(45) Date of Patent: Mar. 17, 2015

(54) DEVICE FOR ATTACHING CHAIN LINKS

(75) Inventors: Michael Betzler, Abtsgmünd (DE); Roland Jakubetz, Aalen (DE)

(73) Assignee: RUD, Ketten Rieger & Dietz GmbH u. Co. KG (DE)

( * ) Notice: Subject to any disclaimer, the term of this patent is extended or adjusted under 35 U.S.C. 154(b) by 0 days.

(21) Appl. No.: 14/005,655

(22) PCT Filed: Mar. 5, 2012

(86) PCT No.: PCT/EP2012/053758
§ 371 (c)(1),
(2), (4) Date: Nov. 20, 2013

(87) PCT Pub. No.: WO2012/126717
PCT Pub. Date: Sep. 27, 2012

(65) Prior Publication Data
US 2014/0290206 A1 Oct. 2, 2014

(30) Foreign Application Priority Data
Mar. 18, 2011 (DE) .......................... 10 2011 005 805

(51) Int. Cl.
*F16G 15/02* (2006.01)
*F16G 13/06* (2006.01)
(Continued)

(52) U.S. Cl.
CPC ................ *F16G 13/08* (2013.01); *F16G 13/12* (2013.01); *F16G 15/04* (2013.01)
USPC ....................................... 59/85; 59/78; 59/86

(58) Field of Classification Search
CPC ......... F16G 13/14; F16G 15/04; F16G 15/10; F16G 17/00
USPC ........................................... 59/78, 85, 86, 93
See application file for complete search history.

(56) References Cited

U.S. PATENT DOCUMENTS

| 2,777,284 A | 1/1957 | Page |
| 3,241,309 A * | 3/1966 | Hadley .............................. 59/85 |

(Continued)

FOREIGN PATENT DOCUMENTS

| AT | 001926 U1 | 1/1998 |
| DE | 7816580 U1 | 9/1978 |

(Continued)

OTHER PUBLICATIONS

German Search Report for application No. 10 2011 005 805.2; dated Aug. 18, 2011; 4 pages.

(Continued)

*Primary Examiner* — David B Jones
(74) *Attorney, Agent, or Firm* — Edell, Shapiro & Finnan, LLC

(57) ABSTRACT

The invention relates to a device (1) for attaching an end link (2) of a chain strand (3) made of chain links (4) of a predetermined geometry. The device comprises a retaining device (5) comprising an insertion segment (7) at one end (6) that can be inserted in an opening (8) of the end link, and a retaining segment (5). The retaining segment comprises a cross section (28) on which the end link can be placed in a limited number of retaining positions, preferably only one single retaining position, from the insertion segment (7). The device further comprises a closure element (12) by which the end link can be permanently secured to the retaining device. In order to prevent tilting of the end link on the retaining device during operation, according to the invention the closure element forms a stop (14) by which a motion of the end link out of the retaining segment (10) in the direction of the insertion segment (7) is blocked.

18 Claims, 6 Drawing Sheets

(51) Int. Cl.
*F16G 13/08* (2006.01)
*F16G 13/12* (2006.01)
*F16G 15/04* (2006.01)

(56) References Cited

U.S. PATENT DOCUMENTS

| | | | | |
|---|---|---|---|---|
| 3,373,560 A | * | 3/1968 | Manney | 59/85 |
| 3,828,550 A | * | 8/1974 | Fink | 59/85 |
| 3,899,873 A | * | 8/1975 | Fink | 59/85 |
| 4,107,917 A | * | 8/1978 | Fink | 59/85 |
| 5,343,912 A | | 9/1994 | Chronister et al. | |
| 6,254,300 B1 | * | 7/2001 | Crow | 59/85 |

FOREIGN PATENT DOCUMENTS

| | | |
|---|---|---|
| DE | 7804117 U1 | 2/1979 |
| DE | 8019733 U1 | 1/1981 |
| DE | 8235292 U1 | 5/1983 |
| DE | 3246490 A1 | 7/1984 |
| DE | 9211131 U1 | 12/1993 |
| DE | 102004057047 A1 | 3/2006 |

OTHER PUBLICATIONS

International Search Report for PCT/EP2012/053758, Jun. 8, 2012 (2 pages).

* cited by examiner

DEVICE FOR ATTACHING CHAIN LINKS

The invention relates to an device for attaching an end link of a chain strand made of chain links of a predetermined geometry, with at least one retaining device comprising at least an insertion segment at at least one end that can be inserted in an opening of the end link at at least one end from the insertion segment and at least one retaining segment, where the retaining segment comprises a cross section on which the end link can be placed in a limited number of retaining positions from the insertion segment, and with at least one closure element by which the end link can be permanently secured to the retaining device. The device according to the invention is particularly designed for round or profiled steel chains.

For attaching end links of a chain strand, for example, connection couplings are known. Such connection couplings are shown in DE 28 05 917 A1, DE 38 03 250 C1, DE 82 466 U1, DE 31 d 970 A1, DE 33 14 075 A1, DE 81 36 770 U1, DE 196 19 831 A1, and DE 1 976 021 U1. The connection between the end link and the connection coupling in these connection couplings comprises the same flexibility as that of the connection between two chain links. These connection couplings are problematic with chain connections of higher grades, in particular grades above 8 with a chain breaking load of more than 800 N/mm$^2$. The connection couplings frequently do not reach such a breaking load.

Achieving high breaking loads with connection couplings is often accompanied with reduced flexibility between the end link and the connection coupling. The end links in the connection couplings of DE 197 43 025 C1, DE 20 2004 009 459 U1 and EP 1 620 640 B1 can be pivoted in one direction only.

For applications of the highest grades, a design for connection couplings as shown, for example, in AT 001 926 U1 and as available on the market like the connecting links "Connex" of the Pewag company and like connection couplings VVS of the RUD company has therefore proven itself. In the following, closest prior art starts out from the connecting link "Connex" in the variant CBP for grade 12 profiled chains, where the invention is not limited to profiled chains, but in particular also focuses on the application for round steel chains.

A disadvantage of closest prior art is the great risk of tilting. In particular at high loads, there is the risk that the end link rotates onto an edge of the retaining segment, and then jams. The risk of fracture increases because the jammed end link can no longer follow changes in the direction of load.

The invention is therefore intended to prevent the risk of the end link held at the device from tilting or jamming.

To solve this problem, it is intended for the above-mentioned device according to the invention, that the closure element forms a stop by which a motion of the end link out of the retaining segment in the direction of the insertion segment is blocked.

It is prevented with this measure, that the end link can move out of the retaining segment and can thereby leave the at least one predetermined retaining position. The risk given with closest prior art is therefore averted, that the end link during operation and with a change in the direction of load, in particular when putting down and again raising the chain strand, can end up in an area in which it can rotate from the retaining position and can jam at the retaining segment with a new change in the direction of load.

The invention can be further improved by a series of measures described below, which are each by itself advantageous and combinable at random with one another.

In a first preferred embodiment, only a single retaining position can be provided in which the end link of the chain strand can be placed on or slid onto the retaining segment. This configuration enables optimal adaptation of the cross section of the retaining segment to the load situation and the shape of the end link. In addition, it is avoided that the end link is incorrectly placed on the retaining segment.

In order to avoid operating errors and to avoid the end link from dropping off the retaining device before attachment of the closure element, the insertion segment can according to a further advantageous embodiment have a cross section on which the end link of the chain strand can be placed or slid onto in a limited number of insertion positions. The end link can by this measure be removed from the retaining device only when the end link assumes an insertion position. In particular in the high-load range, it is advantageous if only a single insertion position is given, so that the cross section of the insertion segment is as large as possible and can be adapted to the shape of the end link. This is particularly useful when the insertion segment is used as an attachment member with which the retaining device can be attached to a mount, for example, a surface of a load or some other attachment device.

The risk of the end link dropping from the retaining device can further be avoided, in that at least one or the insertion position is rotatable vis-à-vis the at least one or the retaining position. In this embodiment, the end link must first be rotated from the retaining position to the insertion position before it can be removed. This rotation can occur in particular in the plane of the end link. A rotation angle of 90° between the insertion position and the retaining position has proven to be secure.

In order to enable a rotation from the insertion position to the retaining position and optionally back again, the retaining device can between the insertion and the retaining segment comprise a transition segment on which the end link is rotatably accommodated about an axis extending transversely to the plane of the end link. Rotatability of the end link on the transition segment can be achieved, for example, in that the transition segment is at no point thicker than the clear width of an opening of the end link.

To reduce the risk of tilting in the retaining position and/or insertion position, it is advantageous if the retaining and/or the insertion segment have a depth which corresponds to at most the difference between the pitch and the material thickness of the end link. The depth is also preferably greater than half of the pitch of the end link. The pitch of the chain strand corresponds to the length of the opening of the end link in its longitudinal extension. With a greater depth, the retaining and/or the insertion segment can guide the end link more accurately straight-lined in the direction transverse to its plane. Its is with the great depth also prevented, that the end link can during large loads run onto edges or corners of the retaining and/or the insertion segment and jam there while deforming them.

For the end link to be able to follow a change in direction of the load in that direction in which the retaining segment blocks, it is provided according to an advantageous embodiment, that the retaining device is in this direction pivotably mounted on a support. This direction can in particular extend transverse to a plane defined by the retaining device.

Regardless of the previous development, the same advantages are obtained in a further advantageous embodiment when the sum of the material thickness of the chain strand and the depth of the cross section of the retaining and/or insertion segment, each measured in the direction of the longitudinal extension of the inner opening of the end link placed on the retaining segment, is at least 90% of the pitch. In order to be able to place the end link with the chain link on the retaining segment, the above sum of the material thickness and the depth is preferably smaller than the pitch.

In order to design the cross section of the insertion and/or the retaining segment as large as possible thereby reducing the stresses acting in the cross section at high loads, the cross section of the insertion and/or the retaining segment comprises two narrow sides curved to a different degree. The cross sectional contour can in particular substantially correspond to the inner contour of the opening of the end link attached to the chain strand, where the inner contour does not comprise the cross section of the chain link hooked to the end link. Small radii can for the cross sectional contour be dispensed with due to risk of deformation prevailing their and due to their small contribution to the overall strength. The narrow side of the retaining segment facing the chain link in the opening of the end link can be slightly convexly curved. Alternatively, it can also have a convex curvature being complementary to the cross section of the chain links.

The curvature of the narrow side of the cross section of the insertion and/or retaining segment can in particular correspond at least in approximation to the curvature at one end of the opening of the end link. In this configuration, the insertion and/or the retaining segment fir snugly against the inside of the bow of the chain link. This results in accurate guidance of the chain link along the insertion and/or retaining segment and increases the stress-bearing cross section. Simultaneously, high surface pressures are prevented.

According to a further advantageous embodiment, a less curved narrow side of the cross section of the retaining and/or the insertion segment can face the chain strand when the end link is placed on. Due to the narrow side having less curvature, good flexibility of the chain link of the chain strand is achieved vis-à-vis the end link and the retaining and/or insertion segment, in particular with round steel chains, because the friction surfaces between this chain link and the narrow side of insertion and/or retaining segment are small. If the end link, like with a profiled steel chain, has a cross section with flat sides, then a greater curvature of the narrow side facing the end link can be desired to keep the contact surface small.

For the end link, with an attached closure element, not to be able to leave the retaining position, it is provided according to a particularly advantageous embodiment, that the closure element or its stop, respectively, is in the sliding direction of the end link from the retaining to the insertion segment spaced from the retaining segment less than a material thickness of the end link.

In order to avoid deformation and/or damage to the closure element or the end link, respectively, during high loads acting on the chain strand in the direction from the retaining to the insertion segment, the contour of the stop facing the retaining segment can substantially follow the outer contour of an end link abutting the stop and placed onto the retaining segment or of the chain link hooked into the end link. In this configuration, the end link or the chain link located therein fits snugly against the stop so that only low surface pressures can arise.

To ensure that the end link with the chain strand can be placed on or slid onto the retaining device in only one single retaining and/or insertion position, an outer contour, resulting from the cross section of a chain link of the chain strand arranged on the narrow side of the cross section of the insertion and/or retaining segment and the cross section of the insertion and/or retaining segment, can be placed on or be inscribed into the opening of the end link, whereas an outer contour, resulting from the cross section of a chain link of the chain strand arranged on another narrow side of the cross section of the insertion and/or retaining segment and the cross section of the insertion and/or retaining segment, cannot be placed on or inscribed into the opening of the end link. In this embodiment, the end link can therefore only be placed on or slid onto the insertion and/or retaining segment when the chain link subsequent to the end link is located at a certain narrow side of the cross section of the insertion and/or retaining segment.

In prior art, the insertion segment, which can simultaneously serve to attach the retaining device on a mount, can preferably be produced by forging. Articulation areas, at which the retaining device is guided pivotably or rotatably, can be penetrated by a bore in which an axle or a retaining pin or bolt is or can be inserted. The axle or retaining pin or bolt is in particular used for pivotable attachment. The axle or retaining pin can comprise a head serving as a closure element or be connected with such a head.

To increase operational safety, it is provided according to a further embodiment, that the closure element can be attached to the device only when no end link is located in the insertion and/or the transition segment. This can be achieved, in that a stop, which is arranged at the closure element for the end link being in an insertion position outside of the retaining segment, while a closure element is mounted to the device, is spaced from the retaining segment at a distance of less than a material thickness of the end link. If the end link is in this embodiment not located at the retaining segment and/or not in the retaining position, then the stop can not be moved to the assembly position. The distance of the stop from the retaining segment is preferably independent of the relative angular position between the closure element and the retaining segment. For this, the stop can extend around the pivot axis of the retaining segment.

The device according to the invention can be provided with a substantially arc-shaped retaining segment and used as a shackle or lifting eye. Furthermore, two identically configured retaining devices can be assembled to form a connection coupling.

In the following, the invention is explained in more detail using embodiments with reference to the drawings. The explanation is intended as an illustration by way of example only, and the different features in the embodiments can following the above explanations be omitted or combined at random, provided the advantage associated with this feature is not crucial. In all figures, components that are similar and/or identical in terms of function and/or design are hereafter assigned the same reference numbers.

First, the design of a device 1 for attaching an end link 2 of a chain strand 3 is described. The chain strand 3 is composed of substantially ring-shaped closed chain links 4, which can have short or long links. The chain strand 3 can in particular be a round steel chain or a profiled chain. The geometry of the chain links 4 results preferably from the relevant standards, such as DIN EN 818-4.

The geometry of the device 1 is defined or predetermined, respectively, by the geometry of the chain links 4. The device 1 is preferably used for a respective very specific type and a very specific size of a chain strand 3.

Figure 1:
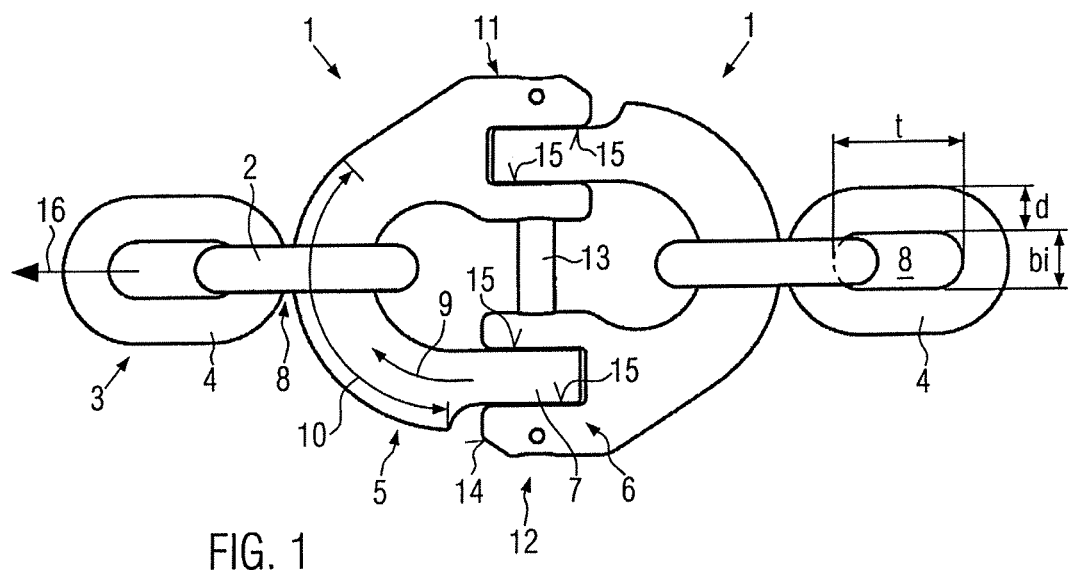
FIG. 1 shows a schematic plan view of a first embodiment of a device according to the invention.

Merely by way of example, FIG. 1 shows that two identical devices 1 are in mirror-image pivotally connected with each other and form a connection coupling for two chain strands 3.

The device shall be explained below with reference to the device 1 on the left in FIG. 1. For the device on the right in FIG. 1, the following description applies respectively.

Device 1 comprises a retaining device 5 which can have a bow-shaped design and on which the end link 2 can be placed or slid onto.

The retaining device 5 at least one end 6 comprises an insertion segment 7 which is adapted to be inserted into an opening 8 of the end link 2. In the sliding direction 9 of the end link 2 behind the insertion segment 7, there is a retaining segment 10 on which the end link 2 is placed during operation and which takes up the loads occurring during operation. The end link 2 is slideable along the retaining segment 10, but can not be rotated about an axis facing in the direction of the retaining segment 10.

As further explained below, the end link 2 can preferably be placed on the insertion segment 7 and the retaining segment 10 in only in a predetermined limited number of positions.

The other end 11 of the retaining device 5 does not need to comprise an insertion segment 7, but, as shown in FIG. 1, can be designed in a thickened manner, for example fork-shaped, in order to improve load bearing capacity. The other end 11 can also serve as a fastening element to attach the retaining device 5 to a mount, preferably pivotably.

The device 1 further comprises a closure element 12, which blocks a motion of the end link 2 out of the retaining segment 10 in the direction of the insertion segment 7. In the embodiment shown in FIG. 1, the two devices 1, mounted in mirror image to each other, each mutually form the closure element 12. Alternatively, the closure element 12 can be formed by a different element, for example a pivot pin 13, by which the device 1 is fastened to a mount.

The closure element 12 can at least partially overlap or cover the insertion segment 7. The closure element 12 can further form a stop 14 facing the retaining segment 5 or in the sliding direction, against which the chain strand 3 strikes before the end link 2 can move out of the retaining segment. Finally, the closure element 12 can be rotatable relative to the retaining device.

The ends 6, 11 of the retaining device 1 can have flat articulation areas 15.

The end link 2 is held slideably along the retaining segment 10—along the sliding direction 9. It can follow changes in the direction of load 16 by a motion in the sliding direction 9 and by a swivel motion of the retaining device 5 relative to the mount.

FIG. 1 has the measurements drawn in for the chain link 4 on the right which are typically standardized for chain strands. The pitch t corresponds to the maximum length of the opening 8 of the chain link in the direction of load 16 or in the direction of its longitudinal extension. The inner width $b_i$ of the opening 8 extends transverse to the direction of load 16 or the longitudinal extension 16, respectively. The thickness d is a thickness measurement for the wire or bar stock from which the chain link 4 can be manufactured.

Placing the end link 2 on the retaining segment 10 of the retaining device 5 is explained in more detail with reference to FIGS. 2 to 10.

Figure 2:
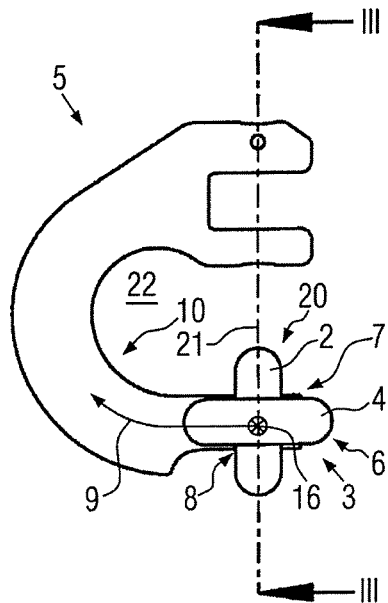
FIG. 2 shows a schematic representation of the device of FIG. 1 in a first assembly step.

FIG. 2 shows the end link 2 in an insertion position 20, in which it is slid onto or placed on the insertion segment 7.

In the insertion position 20, a plane 21 defined by the end link 2 or its opening 8, respectively, extends perpendicular to a plane 22 of the retaining device 5, in which the direction of load 13 is located (FIG. 1). The plane 22 is defined by a retaining segment 10 with a curved or bow-shaped course of the latter.

Figure 3A:
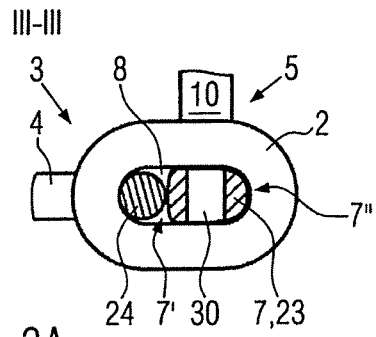
FIG. 3A shows a first variant of a cross section along the line III-III of FIG. 2 in a schematic representation.

It is evident from FIG. 3A that, in the opening 8 of the end link 2, a cross section 23 of the insertion segment 7 and a cross section 24 of the chain link 4 hooked in the end link 2 complement each other such that the end link 2 together with the chain strand 3 can be slid onto or placed on in only a single insertion position on the insertion segment 7. If the end link 2 is twisted in its plane 21 vis-à-vis the insertion position or not perpendicular to the insertion segment 7, then it can not be inserted into the opening 8, as it collides with the end link 2 or the chain link 4. In FIG. 3A, the narrow side 7' facing the chain link 4, just like the narrow side 7" facing away from the chain link 4, are curved outwardly. The convex narrow side 7' is in punctiform contact with the chain link 4. The other narrow side 7" fits snugly against the curvature of the opening 8.

Figure 3B:
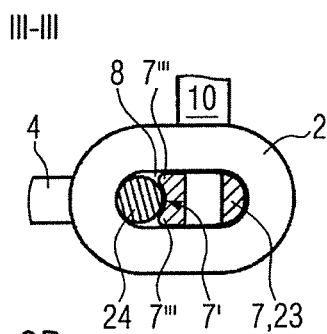
FIG. 3B shows a second variant of a cross section along the line III-III of FIG. 2 in a schematic representation.

A variant to the cross section of the insertion segment 7 shown in FIG. 3A is shown in FIG. 3B. This variant differs in the design of the narrow side 7' facing the chain link 4, which in this variant is curved inwardly, i.e. is concave. The curvature of the narrow side 7' corresponds exactly or approximately to the curvature of the cross sectional area 24 of the chain link 4, so that the chain link 4 can fit snugly to the narrow side 7' of the insertion segment 7.

The cross section 23 of the insertion segment 7 and the chain link 24 overlap transversely to the longitudinal extension of the end link 2 so that the chain link 4 is held in the opening 8 due to the concave curvature of the narrow side 7' between the rounded corners 7''' and the curvature of the opening 8. The narrow side 7' and the curvature of the opening 8 form a bearing-type seat, about which the chain link 4 can be pivoted in a plane of the opening 8 vis-à-vis the end link 2.

Like with the embodiment of FIG. 3A, it is also ensured for the embodiment of FIG. 3B that the end link 2 can be slid onto or placed on the insertion segment 7 only in the cross sectional combination shown. If the cross section 24 of the end link 4 is not located at the concave narrow side, then the chain link 2 can not be slid or placed.

Figure 4:
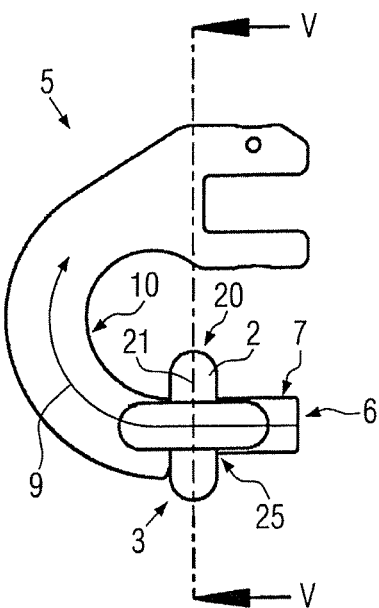
FIG. 4 shows a schematic representation of the device of FIG. 1 in a second assembly step.

If the end link 2 is in the sliding direction 9, which essentially follows the course of the retaining device 5, further slid onto or placed on the retaining device 5, then the position shown in FIG. 4 is reached, in which the end link stills remains in the insertion position 20, but has arrived short of the retaining segment 10. At this point, between the insertion segment 7 and the retaining segment 10, a transition segment 25 can be formed, the cross section 26 of which being located in the opening 8 of the end link 2 changes with respect to the cross section of the insertion segment 7, in particular is reduced.

Figure 5:
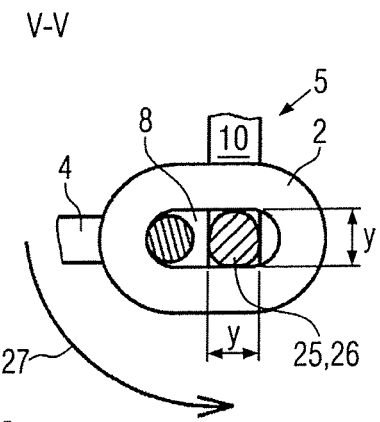
FIG. 5 shows a cross section along the line V-V of FIG. 2 in a schematic representation.
Figure 7:
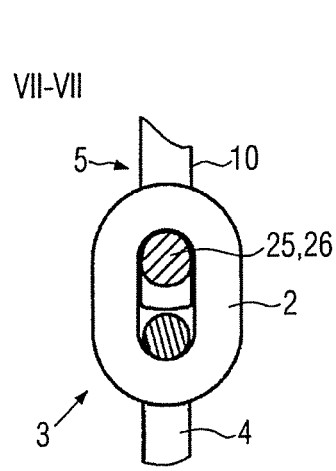
FIG. 7 shows a cross section along the line VIII-VIII of FIG. 2 in a schematic representation.
Figure 6:
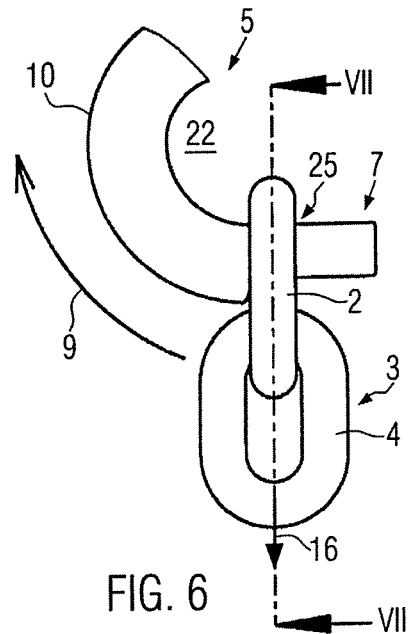
FIG. 6 shows a schematic representation of the device of FIG. 1 in a third assembly step.

The material thickness y of the cross section 26 is in particular at no point greater than the smallest inner width $b_i$ of the opening 8, so that the end link 2 can at the transition segment 25 be rotated in its plane 21 as indicted in FIG. 5 by the arrow 27. After the rotation by preferably 90° in the direction of the arrow 27, the position shown in FIGS. 6 and 7 is reached, in which the direction of load 16 or the direction of the chain strand 3, respectively, is located in the preferably pivotable plane 22.

Now the end link 2 can be slid onto or placed on the retaining segment 10 in the sliding direction 9.

Figure 9:
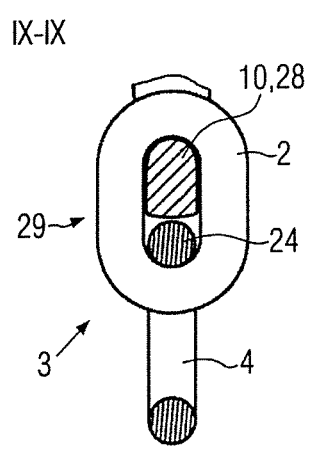
FIG. 9 shows a cross section along the line IX-IX of FIG. 2 in a schematic representation.
Figure 8:
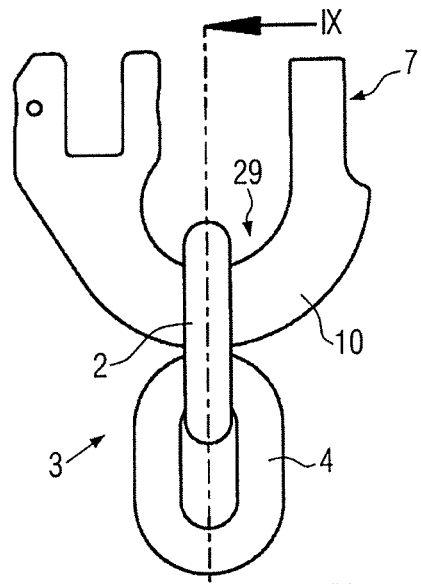
FIG. 8 shows a schematic representation of the device of FIG. 1 in a forth assembly step.

FIGS. 8 and 9 show the end link 2 with the chain strand 3 on the retaining segment 10. As can be seen in the sectional view of FIG. 9, also for the retaining segment 10, its cross section 28 and the cross section 24 of the chain link 4 hooked into the end link 2 preferably complement each other such that the end link 2 with the chain link 4 can be slid onto or placed on in only a single retaining position 29 onto the retaining segment 10.

The cross sections 23, 28 of the insertion segment 7 and the retaining segment 8 can be formed at least approximately identically. They are explained in more detail regarding the design and function with respect to the cross section variant of the retaining segment shown in FIG. 10A, where, for the sake of simplicity, only the cross section 28 of the retaining segment 10 is explained. Preferably, the following explanations apply for the cross-section of the insertion segment 7, where, however, as described above, it can comprise articulation areas 15 on the longitudinal sides and a bore 30 (see FIG. 3A, 3B).

The cross section 28 forms a linear guide for the end link 2 along the sliding direction 9 (cf. FIG. 1). The linear guide prevents rotation of the end link 2 in its plane 21 about the cross section 28 and preferably also an excessive pivoting motion out of this plane. The cross sectional shape causes the direction of load 16 or the center line 40 of the end link 2, respectively, to always remains in its longitudinal direction in the plane 22. To avoid tilting and/or jamming of the end link 2 at the cross section 28, the retaining segment 10 has a depth x in the respective direction of load 16, which is in particular greater than half a pitch t of the chain strand 3 and smaller than the difference between the pitch t and a material thickness d of the chain link 4.

Preferably, the retaining segment forms at least two guide surfaces 43, 44 parallel to each other forming the two longitudinal sides 44 of the retaining segment 10. The guide surfaces 43 are associated with the straight inner sides of the opening 8. They extend preferably in the longitudinal direction of the end link 2 also more than half of the pitch t.

The oppositely located narrow sides 10', 10" of the retaining segment 10, which at the position of the end link 2 face in the direction opposite to the direction of load 16, can be curved to a different degree. The curvature of the one narrow side, preferably this is the narrow side 10' facing away from the chain strand 3, has an outward curvature which corresponds to the curvature of the opening 8 of the end link 2 at its narrow side. Thereby, the convex retaining segment 10 fits snugly into the opening 8 of the placed-on or slid-on end link 2.

The narrow side 10' facing in the direction of load 16 or the chain 3, respectively, preferably comprises a lesser convex curvature 47 than the other narrow side 10" facing the bow of the end link 2, i.e. is preferably flatter but also spherical. The size of a contact surface 48 between the chain link 4 with its highly curved surface and the retaining segment 10 is thereby reduced.

Due to the different degree of curvature, it is also achieved that only one retaining position 29 exists. If the chain link 4, namely, is not located across from the narrow side 45 with the lesser curvature 47, then the two cross sections 24, 28 can no longer be inserted or inscribed into the opening 8 or the retaining segment 10 can not be inserted into the opening 8.

In the retaining position 29, the sum of the depth x of the retaining segment and the material thickness d of the chain link 4 amounts to at least 90% of the pitch t, in order to enable accurate guidance of the end link 2. The sum is smaller than the pitch t.

Figure 10A:
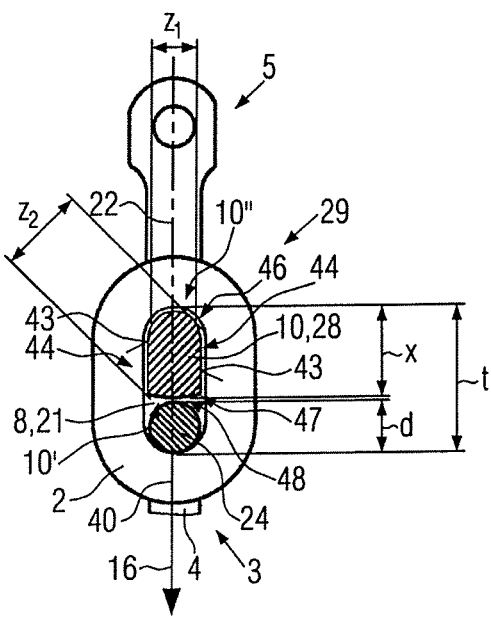
FIG. 10A shows a schematic representation of the cross section of FIG. 9 for explaining the cross sections.

FIG. 10A additionally shows a thickness $z_1$ of the retaining segment 10 transverse to the direction of load 16. The thickness $z_1$ is smaller than the smallest clear width in the direction of the inner width b, of the opening 8, so that the cross section 28 can be inserted or slid into the opening 8. The largest cross sectional dimension $z_2$ extending in a diagonal direction is greater than a largest clear width in the direction of the inner width $b_i$.

Figure 10B:
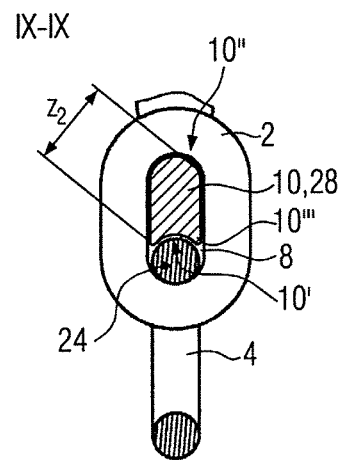
FIG. 10B shows a second variant of a cross section along the line IX-IX of FIG. 2 in a schematic representation.

FIG. 10B shows a cross sectional variant with respect to the cross section 28 of the retaining segment 10 shown in FIGS. 9 and 10A. The cross sectional variant of FIG. 10B in its basic form corresponds to the cross sectional variant of the insertion segment 7 described in FIG. 3B with the difference that no bore 30 is provided.

The narrow side 10" of the cross section 28 facing the chain strand 3 or the chain link 4, respectively, is concave. The curvature of the concave narrow side 10' corresponds to the curvature of the cross section 24 of the chain link 4, so that both fit snugly together in the opening 8, as explained above for FIG. 3B. As with the cross section shown in FIG. 3B, the concave curvature of the narrow side 10" together with the curvature of the opening 8 forms a rotary bearing for the chain link 4.

The embodiment of FIG. 10B (as well as that of FIG. 3B) has the advantage that the largest cross sectional dimension $z_2$ of the retaining segment 10 is larger due to the rounded edges 10''' encompassing the chain link 4 in the opening 8. Thereby, the depth of the surface, on which the end link 2 is guided on the retaining segment 10, is increased as compared with the embodiment of FIG. 10A. The end link 2 is thereby guided more securely on the retaining segment 10.

Figure 11:
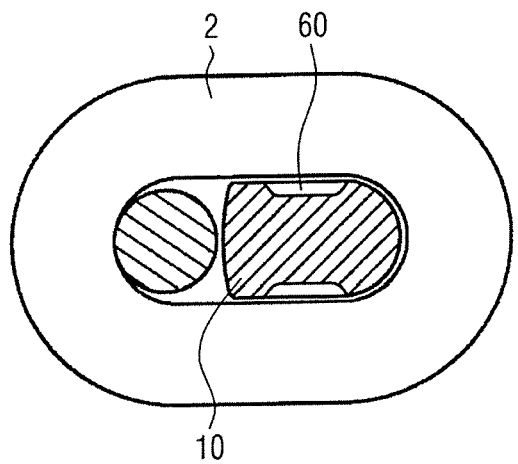
FIG. 11 shows a further embodiment of the device according to the invention in a schematic sectional representation.

In order to reduce the friction between the end link 2 and the retaining segment 10 during operation, one or more recesses 60 can according to another embodiment be arranged on the surfaces of the retaining segment 10 facing the end link 2. This is shown in FIG. 11. Due to the recesses 60, a multi-position linear guide of the end link 2 is achieved along the retaining segment 10. The recesses 60 preferably extend with their longer dimension in the sliding direction 9. The recesses can be formed by forging methods in one manufacturing step when manufacturing the retaining device 5. They reduce the contact surface between the end link 2 and the retaining device 5, so that it can better follow a change in the direction of load 16 by a motion along the retaining segment 10 in the sliding direction 9 towards one of the ends 6, 11. In addition, the recesses 60 hinder the accumulation of dirt between the end link 2 and the retaining segment 10, which can lead to increased friction between the retaining segment and the end link.

The function of the closure element 12 is explained in more detail with reference to FIG. 12.

When changing the direction of load 16 from the direction for example shown in FIG. 1 in the plane 22 toward the insertion segment 7, it can be prevented by the closure element 12 in accordance with the invention, that the end link 2 leaves the retaining segment 10. For this, the stop 14 formed by the closure element 12 is at most a material thickness d away in the sliding direction 9 from the retaining segment 10.

The stop 14 is arranged at least on the side of the closure element 12 facing the retaining segment 10, so that it cooperates with the chain link 4 hooked into the end link 2, preferably cooperating with an outer side of the bow of the chain link 4 passing through the opening 8.

Figure 12:
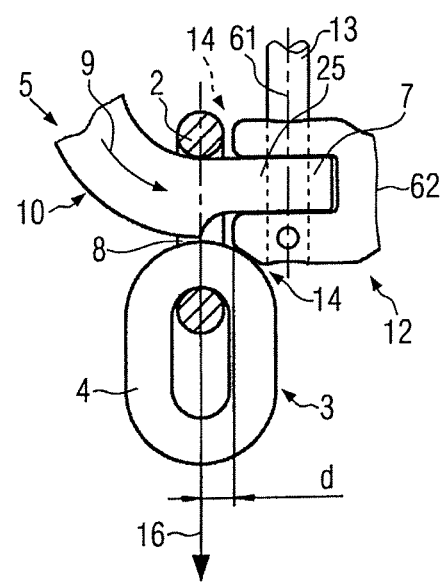
FIG. 12 shows a schematic sectional view of the embodiment of FIG. 1 in a further operating position.

Alternatively, as indicated by the dashed arrow in FIG. 12, the stop 14 can cooperate directly with the end link 2 and can be arranged, for example, on the side of the retaining device 5 facing away from the chain strand 3.

The stop 14 extends preferably substantially circular-sector-shaped about an axis 61, about which the retaining device 5 is during operation pivotable with respect to the mount 62. In this manner the position of the stop 14 is independent of the relative position of the retaining device 5 to the mount 62.

In particular, the coupling element 12 blocks the motion of the end link 2 from the retaining segment 10 to the transition segment 25. There, the risk would exist that the end link 2 rotates in its plane 21 and can not longer be placed or slid back on the retaining segment.

Figure 13:
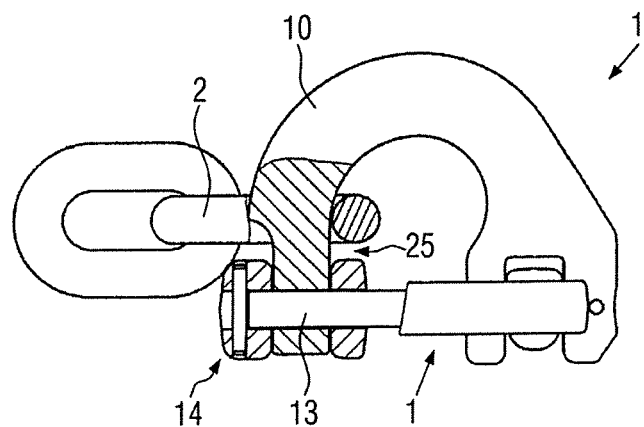
FIG. 13 shows a schematic view of the embodiment of FIG. 1 in a further operating position.

FIG. 13 shows the device 1 of FIG. 1 in the angled state in which the one device is pivoted relative to the other device about the pivot pin 13 by 90 degrees. Since the stop 14 has a circular-sector or circular base, the end link 2 can also in the angled state not arrive in the transition segment 25, but remains at the retaining segment 10. This is independent of the angular position of the two devices 1 to each other.

Figure 14:
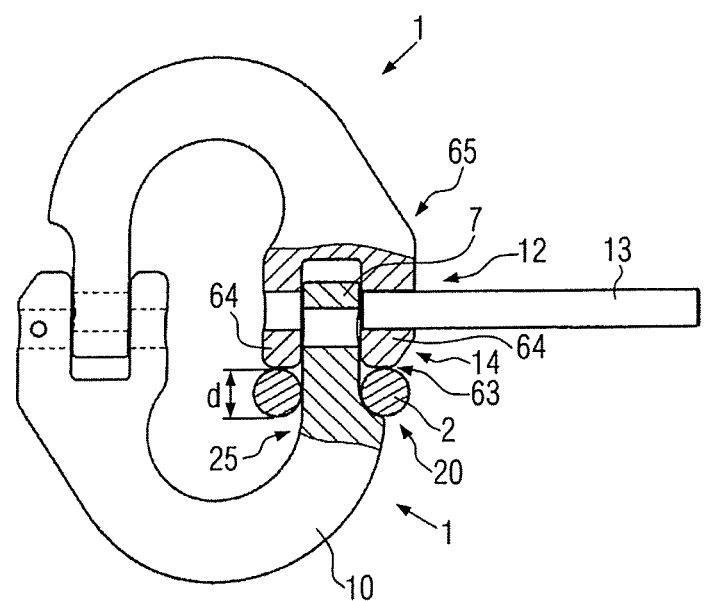
FIG. 14 shows a schematic view of the embodiment of FIG. 1 in a further operating position.

FIG. 14 shows that a closure element 14, presently a further device 1, can be mounted only when the end link 2 is located in the retaining segment 10.

This is achieved in that a stop 63 facing the retaining segment 10 is provided at the closure element 12, which is about its pivot axis 61 less than a material thickness d of the end link 2 away from the retaining segment 10 and forms a stop for the end link 2 in the insertion position 20. Thereby, the end link 2 in the insertion position 20 blocks the final assembly position of the closure element.

The stop surface 63 preferably extends at least partially about the pivot axis 61, so that the assembly position can not be reached irrespective of the angular position of the closure element vis-à-vis the device 1.

As FIG. 14 further illustrates, the two identical devices 1 mounted to each other have the stop 63 be formed by the ends 64 of the insertion segment 7 of the fork segment 65 encompassing the respective other device 1.

As already briefly explained with reference to FIG. 1, the device 1 with the retaining device 5 and the closure element 12 can be configured in variations. For example, two retaining devices 5 can according to the embodiment of FIG. 1 be connected to each other and mutually support each other. In this, the one retaining device 5 respectively forms the closure element 12 for the respective other retaining device 5. The respective other end preferably serves as the closure element 12, which forms a fork for receiving the insertion segment 7 of the respective other retaining device 5.

Figure 15:
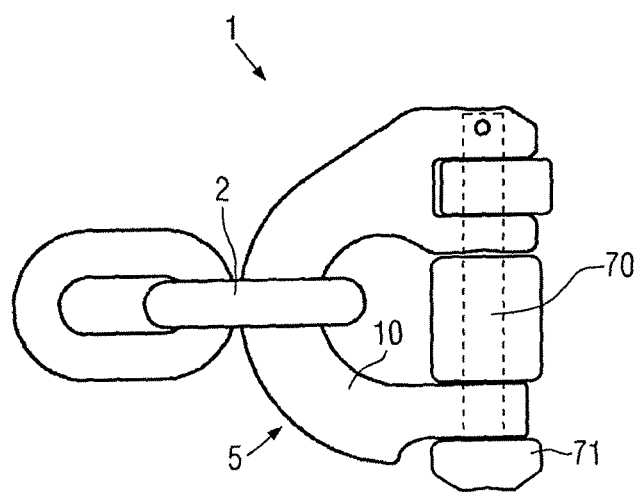
FIG. 15 shows a further embodiment of the device according to the invention in a schematic representation.

Alternatively, the retaining device 5 can, for example, also form part of a shackle as a device or act as a stop being firmly attached to a surface of a transportation object. FIG. 15 shows as an example the use as a shackle. The retaining device 5 is closed by a shackle pin 70. The shackle pin 70 can comprise a head 71 or be connected to a head 71, which blocks the motion of the end link 2 out from the retaining segment 10, as is shown schematically in FIG. 15, and serves as a closure element.

When the device 1 is used as a stop, then the closure element 71 can be formed by a welded-on eye.

LIST OF REFERENCE NUMERALS 1 device
2 end link
3 chain strand
4 chain link
5 retaining device
6 end of the retaining device
7 insertion segment
7' narrow side of the insertion segment
7" narrow side of the insertion segment
7''' corners
8 opening
9 sliding direction
10 retaining segment
10' narrow side of the retaining segment
10" narrow side of the retaining segment
10''' narrow side of the retaining segment
11 other end of the retaining device
12 closure element
13 pivot pin
14 stop
15 articulation area
16 direction of load
20 insertion position
21 plane of the end link
22 plane of the retaining segment, load plane
23 cross section of the insertion segment
24 cross section of the chain link
25 transition segment
26 cross section of the transition segment
27 arrow
28 cross section of the retaining segment
29 retaining position
30 bore
40 center line of the end link in the longitudinal direction
43 guide areas of the retaining segment
44 longitudinal side of the retaining segment
46 curvature of the one narrow side
47 curvature of the other narrow side
48 contact surface between the chain link and the retaining segment
60 recess
61 pivot axle of the retaining device
62 mount
63 stop
64 ends
65 fork segment
70 shackle pin
71 head
$b_i$ inner width of the opening
d material thickness of the chain link
t pitch
x depth of the retaining segment
y material thickness of the transition segment
$z_1$ thickness of the retaining segment transverse to the direction of load
$z_2$ greatest cross section of the retaining segment

The invention claimed is:

1. A device (1) for attaching an end link (2) of a chain strand (3) made of chain links (4) of a predetermined geometry, comprising:
at least one retaining device (5) comprising:
at least one insertion segment (7) at at least one end (6) of the retaining device, wherein the insertion segment can be inserted into an opening (8) of said end link, and
at least a retaining segment (10), wherein said retaining segment comprises a cross section (28) on which said end link can be placed in a limited number of retaining positions (29) from said insertion segment, and
at least one closure element (12) configured to permanently secure said end link to said retaining device, characterized in that said closure element (12) forms a stop (14) configured to block said end link (2) from moving out of said retaining segment (10) via said insertion segment (7).

2. The device (1) according to claim 1 characterized in that only a single retaining position (29) is provided in which said end link (2) can with the chain strand (3) be slid onto or placed on said retaining segment (10).

3. The device according to claim 1, characterized in that said insertion segment (7) comprises a cross section (23) on which said end link (2) of said chain strand (3) can be slid or placed in a single insertion position (20).

4. The device (1) according to claim 1, characterized in that said retaining device (5) between said insertion and said retaining segment (7, 10) comprises a transition segment (25) on which said end link (2) can be received rotatably in its plane (21).

5. The device (1) according to claim 1, characterized in that at least one of said retaining and said insertion segment (10, 7) has a depth (x) that is greater than half of the pitch (t) of said end link (2) and smaller than the difference between said pitch (t) and the material thickness (d).

6. The device (1) according to claim 1 or 3, characterized in that the sum of the material thickness (d) of said chain link (4) hooked into said end link (2) and said depth (x) of said cross section (23, 28) of said retaining and/or insertion segment (10, 7), each measured in the direction of the pitch (t) of said end link (2) placed on said retaining segment (10), corresponds to at least 90% and not more than said pitch (t).

7. The device (1) according claim 1 or 3, characterized in that said cross section (23, 28) of at least one of said insertion and said retaining segment (7, 10) comprises two narrow sides (7', 7", 10', 10") curved to a different degree.

8. The device (1) according to one of claim 1, characterized in that the curvature (46) of a narrow side (7", 10") of said insertion and/or retaining segment (7, 10) corresponds at least approximately to the curvature of an opening (8) of said end link (2).

9. The device (1) according to claim 1, characterized in that a weaker convexly curved or a concave narrow side (7', 10') of said retaining and/or insertion segment (7, 10) faces said chain link (3) when said end link (2) is placed or slid on.

10. The device (1) according to claim 1, characterized in that said stop (14) is spaced less than a material thickness (d) of said end link (2) from said retaining segment (10) in the sliding direction (9) of said end link (2).

11. The device (1) according to claim 1, characterized in that said stop (14) faces said retaining segment (10) and has a contour substantially following an outer contour of a chain link (4) hooked into said end link (2).

12. The device (1) according to claim 1 or 3, characterized in that, an outer contour resulting from the combination of a cross section (24) of a chain link (4) of said chain strand arranged at a narrow side (7", 10") of said cross section (23, 28) of said insertion or retaining segment (7, 10) with said cross section (23, 28) of the respective insertion or retaining segment (7, 10), is insertable or inscribable into said opening (8) of said end link (2), whereas an outer contour resulting from the combination of a cross section (24) of a chain link (4) of said chain strand arranged at another narrow side (7", 10") of said cross section (23, 28) of said insertion or retaining segment (7, 10) with said cross section (23, 28) of said insertion and/or retaining segment (7, 10), is not insertable or inscribable into said opening (8) of said end link (2).

13. The device (1) according to claim 1, characterized in that a stop (63) of said closure element (12) for said end link (2) being in an insertion position (20) outside of said retaining segment (10), for a closure element (12) mounted to said device (1), is spaced from said retaining segment (12) at a distance of less than a material thickness (d) of said end link (2).

14. A device (1) for attaching an end link (2) of a chain strand (3) made of chain links (4) of a predetermined geometry, comprising:
at least one retaining device (5) including an insertion segment (7) with a cross section (23) configured to receive an opening of said end link in a single insertion position (20) and a retaining segment (10) with a cross section (28) configured to receive said end link from said insertion segment in a limited number of retaining positions; and
at least one closure element (12) configured to permanently secure said end link (2) to said retaining device by blocking said end link (2) from moving out of said retaining segment (10) via said insertion segment (7).

15. The device (1) of claim 14, wherein the single insertion position (20) causes the the chain strand (3) to be oriented in a specific orientation with respect to the device (1) once the end link (2) is received on the retaining segment (10).

16. The device (1) of claim 15, wherein the chain strand (3) extends away from the insertion segment (7) when in the specific orientation.

17. A device (1) for attaching an end link (2) of a chain strand (3) made of chain links (4) of a predetermined geometry, comprising:
at least one retaining device (5) including an insertion segment (7) with a cross section (23) configured to receive an opening of said end link (2) and a retaining segment (10) with a cross section (28) configured to receive said link in a limited number of retaining positions; and
a closure element (12) configured to close the retaining device (5) subsequent to receiving an end link (2), the retaining device (5) and closure element forming a closed loop once the closure element (12) is secured to the retaining device (5).

18. The device (1) of claim 17, wherein the insertion segment (7) includes a cross section (23) configured to provide a single insertion position.

* * * * *

UNITED STATES PATENT AND TRADEMARK OFFICE
CERTIFICATE OF CORRECTION

| | | |
|---|---|---|
| PATENT NO. | : 8,978,350 B2 | Page 1 of 1 |
| APPLICATION NO. | : 14/005655 | |
| DATED | : March 17, 2015 | |
| INVENTOR(S) | : Michael Betzler et al. | |

It is certified that error appears in the above-identified patent and that said Letters Patent is hereby corrected as shown below:

In the Specification

Column 5, line 35, before "at" insert --at--.

Signed and Sealed this
Twenty-first Day of July, 2015

Michelle K. Lee
*Director of the United States Patent and Trademark Office*